United States Patent [19]

Chang

[11] Patent Number: 5,483,727
[45] Date of Patent: Jan. 16, 1996

[54] OPERATING HANDLE FOR A CUTTING DEVICE

[75] Inventor: Chiu-Tsun Chang, Taichung, Taiwan

[73] Assignee: P&F Brother Industrial Corporation, Taichung, Taiwan

[21] Appl. No.: 397,363

[22] Filed: Mar. 2, 1995

[51] Int. Cl.⁶ .................................................. A47B 95/02
[52] U.S. Cl. ..................... 16/110 R; 83/DIG. 1; 83/581; 83/471.3; 83/477.1
[58] Field of Search ............................ 16/110 R, 110.5; 83/DIG. 1, 581, 471.3, 477.1

[56] References Cited

U.S. PATENT DOCUMENTS

| | | | |
|---|---|---|---|
| 4,549,097 | 10/1985 | Ulmer | 307/326 |
| 4,589,208 | 5/1986 | Iwasaki et al. | 30/376 |
| 5,005,295 | 4/1991 | Fushiya | 83/DIG. 1 |
| 5,401,928 | 3/1995 | Kelley | 200/510 |

Primary Examiner—P. Austin Bradley
Assistant Examiner—Chuck Y. Mah
Attorney, Agent, or Firm—Cushman Darby & Cushman

[57] ABSTRACT

An operating handle for a cutting device includes a handle body adapted to be mounted securely on the saw carrier of the device; a switch installed on the handle body and adapted to be activated to drive a cutting saw carried by the carrier; a trigger member mounted swingably on the handle body; a switch driving piece mounted swingably on the handle body and biased to locate at a predetermined position adjacent to the trigger member, the trigger member being capable of being rotated in a first direction so as to rotate the switch driving piece in a second direction opposite to the first direction, thereby activating the switch to drive the saw; and a lock unit releasably locking the switch driving piece on the handle body to prevent the switch driving piece from rotation in the second direction.

3 Claims, 6 Drawing Sheets 5,483,727

OPERATING HANDLE FOR A CUTTING DEVICE

BACKGROUND OF THE INVENTION

1. Field of the Invention

The invention relates to an operating handle, more particularly to an operating handle of a cutting device which is provided with a lock unit for preventing the device from untimely performing a cutting action.

2. Description of the Related Art

FIG. 1 shows a conventional cutting device 10 which includes a base 11 with an upright post 12, a saw carrier 13 mounted swingably to the post 12, a circular cutting saw 14 carried rotatably by the carrier 13, a motor 15 mounted on the carrier 13 and connected to the circular cutting saw 14 for driving the latter, and an operating handle 16 for moving the circular cutting saw 14 toward and away from the base 11.

Note that in the conventional cutting device 10, a portion of the circular cutting saw 14 is exposed from the carrier 13 and covered by a transparent cover 18 which be easily moved into the carrier 13. The operating handle 16 is provided with a switch 17 which is electrically connected to and for actuating the motor 15. Since the switch 17 is disposed on the outer surface of the operating handle 16 so that in a situation where the cover 18 is opened by a child, the child may accidentally touch the switch 17, thereby driving the circular cutting saw 14, which can cause injury to the child.

SUMMARY OF THE INVENTION

The main object of the present invention is to provide the operating handle of a cutting device with means for preventing untimely actuation of the driving motor of the device.

Accordingly, the operating handle for a cutting device of the present invention includes a handle body adapted to be mounted securely on a saw carrier; a switch installed on the handle body and adapted to be activated to drive the motor; a trigger member mounted swingably on the handle body; a switch driving piece mounted swingably on the handle body and biased to a predetermined position adjacent to the trigger member, the trigger member being capable of being rotated in a first direction so as to rotate the switch driving piece in a second direction opposite to the first direction, thereby activating the switch to drive the motor; and a lock unit releasably locking the switch driving piece on the handle body so as to prevent the switch driving piece from rotation in the second direction.

Since performing a cutting action on a workpiece requires two steps, firstly unlocking the switch driving piece from the lock unit and secondly pressing the trigger member to rotate the switch driving piece and thus actuating the switch, the motor will not be actuated unless these two steps are effected at the same time. Thus, in the event either the lock unit or the trigger member is touched accidentally, the motor will not be actuated.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
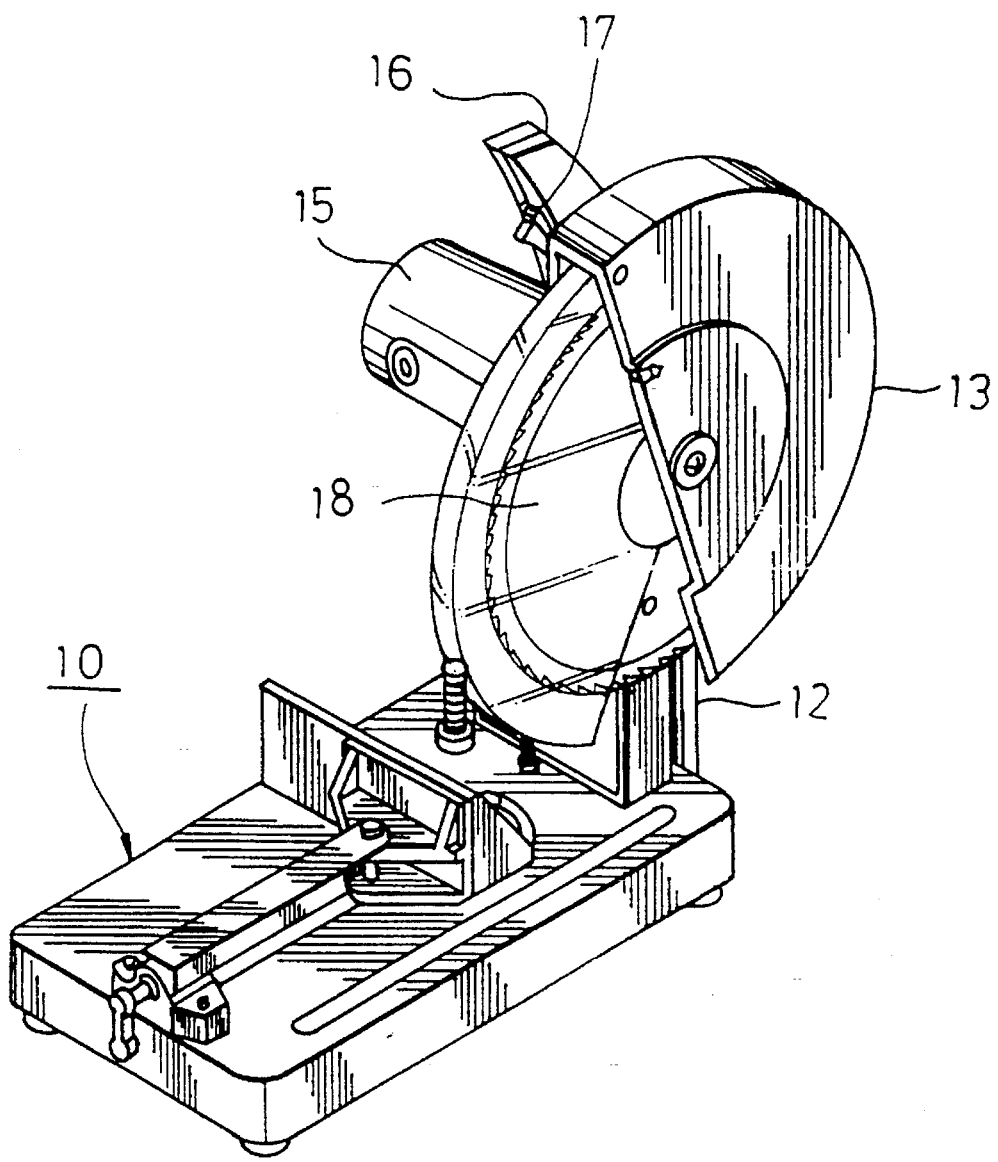
FIG. 1 is a perspective view of a conventional cutting device with an operating handle.
Figure 2:
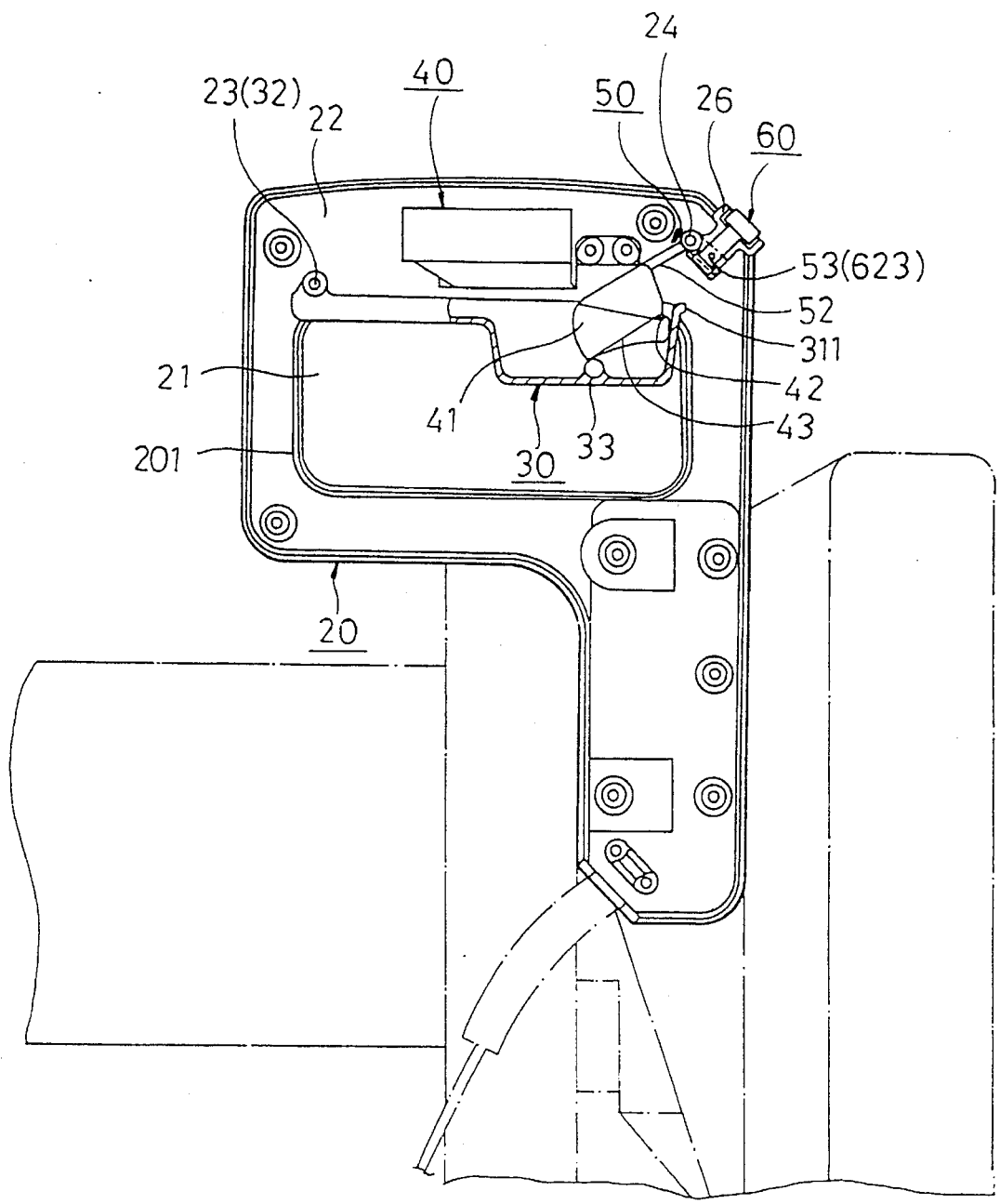
FIG. 2 shows an operating handle of the present invention to be used in conjunction with a cutting device.

Referring to FIG. 2, an operating handle according to the present invention is adapted to be connected to a saw carrier (shown by dotted lines) of a cutting device and includes a P-shaped handle body 20 with an internal wall 201 to define a through-hole 21 formed through the handle body 20 so that an operator's fingers can be inserted through the through-hole 21 for gripping action on the grip portion 22 of the handle body 20. The internal wall 201 is provided with an aperture 202 (see FIG. 3A).

A switch 40 is installed within the P-shaped body 20 and connected electrically to the driving motor (not shown) of the cutting device.

Figure 3:
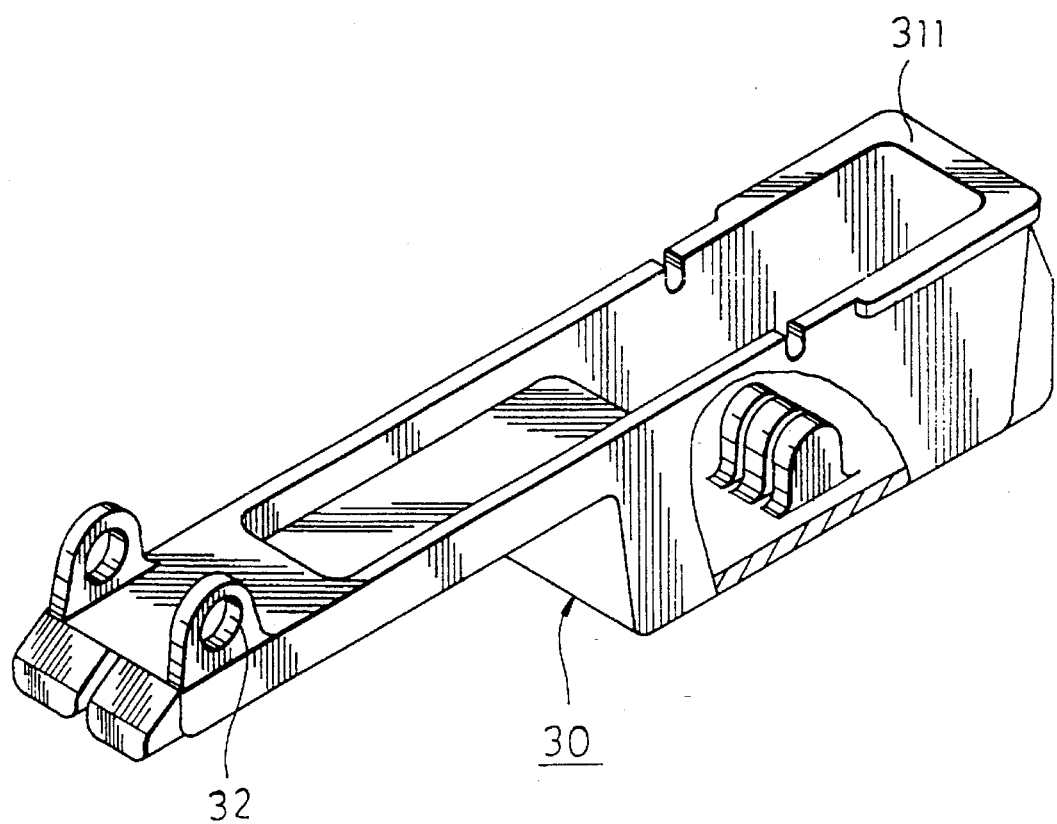
FIG. 3 is a perspective view showing a trigger member of the operating handle of the present invention.
Figure 3A:
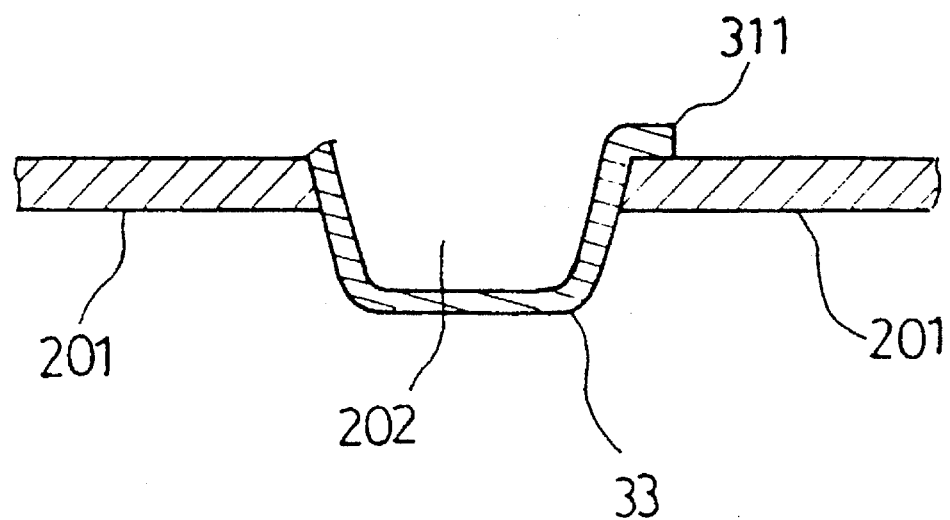
FIG. 3(A) shows an aperture formed through the operating handle, illustrating the trigger member projects outwardly from the operating handle through the aperture.

Referring to FIGS. 2, 3 and 3A, a trigger member 30 extends through the aperture 202 of the internal wall 201 and has a first end portion provided with pivot holes 32 through which a pivot 23 extends so as to mount pivotally the trigger member 30 to the P-shaped body 20, a second end portion provided with a retaining flange 311 which has a bottom surface abutting against the top surface of the internal wall 201 so as to retain the trigger member 30 on the handle body 20. A protrusion unit 33 (see FIG. 3A) projects from the top surface of the bottom wall of the trigger member 30.

Referring again to FIG. 2, a switch driving piece 41 is provided between the trigger member 30 and the switch 40 and is mounted swingably about a pivot pin 42. A torsion spring 43 biases the switch driving piece 41 and thus biases the trigger member 30 to their normal positions. Thus, when the trigger member 30 is pressed so as to pivot in the first direction, the switch driving piece 41 is pushed by the protrusion unit 33 to rotate about the pivot pin 42 in a second direction opposite to the first direction.

Figure 4:
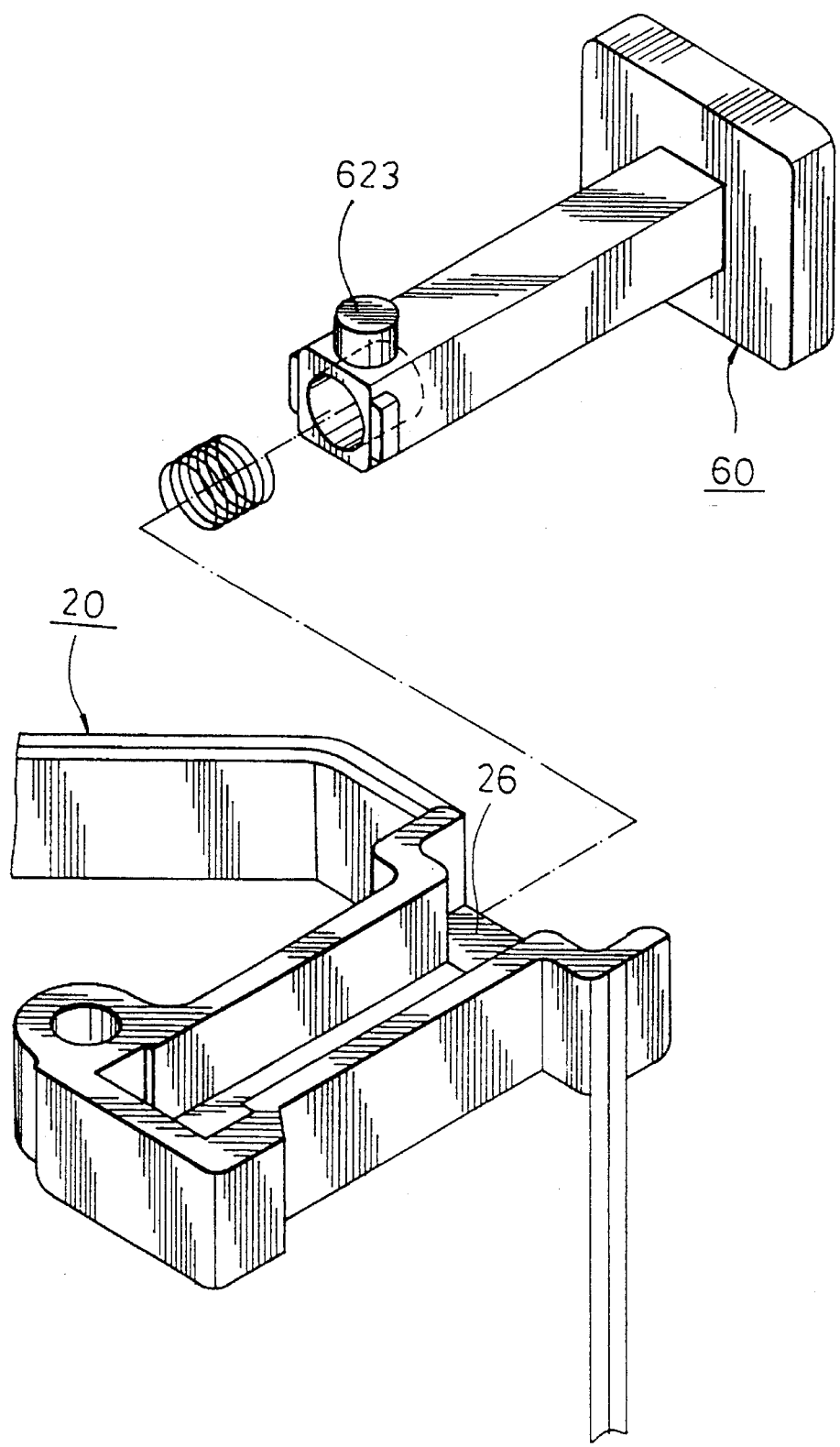
FIG. 4 is a partially exploded view showing the lock unit of the operating handle of the present invention.

Referring to FIGS. 2 and 4, a lock unit includes a substantially T-shaped push button 60 installed in the recess 26 formed in the P-shaped body 20, and an L-shaped crank 50 mounted pivotally in the P-shaped body 20 by a pivot 24. The L-shaped crank 50 has a first crank arm provided with a pivot hole 53 engaging the cylindrical projection 623 of the push button 60 and a second arm 52 pressed against the switch driving piece 41. Thus, the switch driving piece 41 is prevented from rotation about the pivot pin 42 in the second direction.

Figure 5:
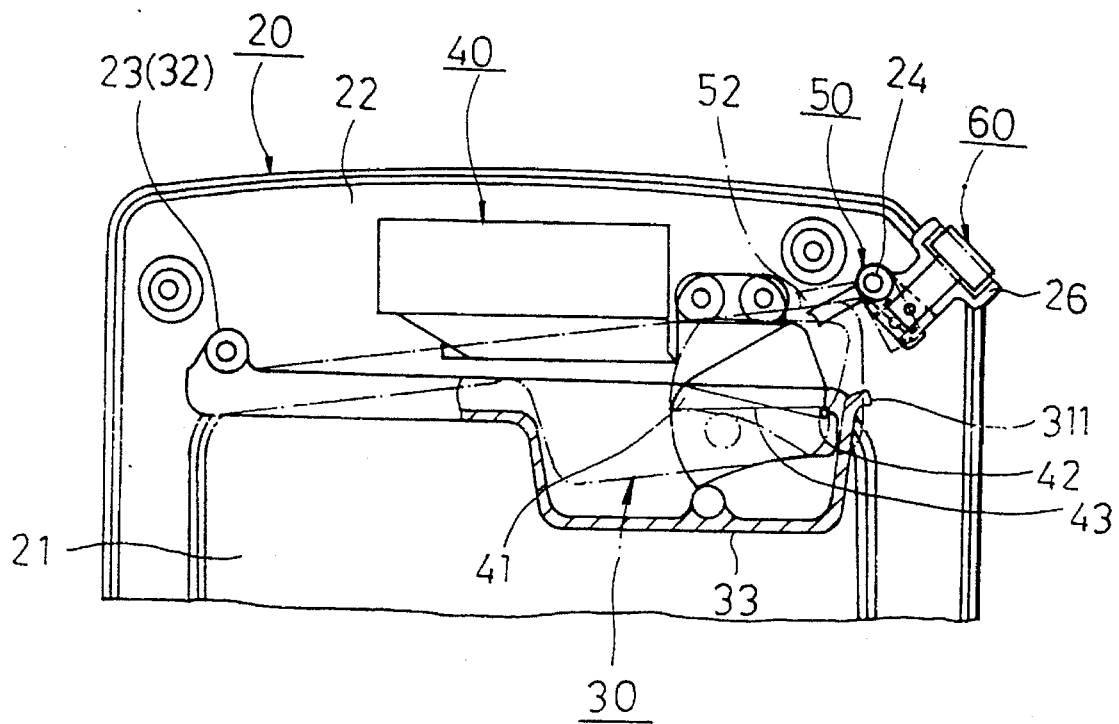
FIG. 5 illustrates how the trigger member and the lock unit of the operating handle of the present invention are performed.

Referring to FIG. 5, when it is desired to activate the motor (not shown) and thus driving the circular cutting saw rotatably on the saw carrier, the grip portion 22 of the handle body 20 is held by a hand. The push button 60 is first pressed by a thumb so as to swing the second crank arm 52 of the crank 50 away from the switch driving piece 41 to the position shown by dotted lines, thereby releasing the switch driving piece 41 from the crank 50. Then the trigger member 30 is pressed by an index finger so as to rotate in the first direction, thus rotating the switch driving piece 41 in the second direction. Rotation of the switch driving piece 41 activates the switch 40 and thus the cutting saw.

As explained above, performing a cutting action on a workpiece requires two steps to activate the motor, firstly unlocking the switch driving piece 41 from the crank 50 and secondly pressing the trigger member 30 to rotate the switch driving piece 41 in the second direction. The motor will not be actuated unless these two steps are effected at the same time. Thus, in the event either the push button 60 or the trigger member 30 is touched accidentally, the motor will not be actuated.

With the present invention thus explained, it is obvious to those skilled in the art that various modifications and variations can be made without departing from the scope and spirit thereof. Therefore this invention is intended to be limited only as in the appended claims.

I claim:

1. An operating handle for a cutting device, said device including a base, a saw carrier mounted swingably on the base, a cutting saw carried on the carrier, and a motor driving the saw, said operating handle comprising:

a handle body adapted to be mounted securely on the carrier;

a switch installed on said handle body and adapted to be activated to drive the motor;

a trigger member mounted swingably on said handle body;

a switch driving piece mounted swingably on said handle body and biased to locate at a predetermined position adjacent to said trigger member, said trigger member being capable of being rotated in a first direction so as to rotate said switch driving piece in a second direction opposite to said first direction, thereby activating sad switch to drive the motor; and a lock unit releasably locking said switch driving piece on said handle body so as to prevent said switch driving piece from rotation in said second direction.

2. The operating handle as defined in claim 1, wherein said lock unit includes a push button installed on said handle body and a crank mounted pivotally within said handle body and having a first crank arm connected pivotally to said push button and a second crank arm pressed against said switch driving piece so as to prevent rotation of said switch driving piece in said second direction;

depression of said push button swinging said second arm of said crank away from said switch driving piece so as to release said switch driving piece from said crank, thereby permitting said switch driving piece to rotate in said second direction.

3. The operating handle as defined in claim 2, wherein said handle body is generally P-shaped and has an internal wall to define a through-hole formed through said handle body so that an operator's fingers can be inserted through said through-hole for gripping action, said internal wall being provided with an aperture through which a portion of said trigger member extends from said P-shaped body, said push button being located relative to said trigger member so that said push button and said trigger member can be respectively and simultaneously operated by a thumb and an index finger of a handle of the operator.

* * * * *